United States Patent
Takahashi et al.

(10) Patent No.: US 10,150,356 B2
(45) Date of Patent: Dec. 11, 2018

(54) GLASS RUN

(71) Applicant: TOYODA GOSEI CO., LTD., Kiyosu-shi, Aichi-ken (JP)

(72) Inventors: Yoshitaka Takahashi, Kiyosu (JP); Yuzo Tajima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 24 days.

(21) Appl. No.: 15/426,688

(22) Filed: Feb. 7, 2017

(65) Prior Publication Data
US 2017/0260788 A1    Sep. 14, 2017

(30) Foreign Application Priority Data
Mar. 11, 2016    (JP) ................. 2016-047775

(51) Int. Cl.
*B60J 10/76*    (2016.01)
*B60J 1/17*    (2006.01)
*B60R 13/04*    (2006.01)

(52) U.S. Cl.
CPC ............. *B60J 10/76* (2016.02); *B60J 1/17* (2013.01); *B60R 13/04* (2013.01); *E05Y 2900/55* (2013.01)

(58) Field of Classification Search
CPC .................. B60J 10/33; B60J 10/76
See application file for complete search history.

(56) References Cited

U.S. PATENT DOCUMENTS

| | | | | |
|---|---|---|---|---|
| 4,143,192 A | * | 3/1979 | Hayden | B60R 13/04 293/1 |
| 5,317,835 A | * | 6/1994 | Dupuy | B60J 10/235 49/377 |
| 7,669,370 B2 | * | 3/2010 | Oba | B60J 10/24 49/475.1 |
| 7,735,263 B2 | * | 6/2010 | Oba | B60J 10/24 49/490.1 |
| 8,166,708 B2 | * | 5/2012 | Ellis | B60J 5/0402 49/441 |
| 8,479,449 B2 | * | 7/2013 | Titz | B60J 10/78 49/440 |
| 8,793,934 B2 | * | 8/2014 | Sato | B60R 13/04 296/146.2 |

(Continued)

FOREIGN PATENT DOCUMENTS

JP    2014-196051 A    10/2014

*Primary Examiner* — Catherine A Kelly
(74) *Attorney, Agent, or Firm* — Posz Law Group, PLC (57) ABSTRACT

A glass run capable of reducing protrusions in surfaces thereof to the minimum, and preventing peeling of an exterior decorative member. The glass run includes a trim section and a glass run section. An outer side wall of the glass run section is formed integrally with a bottom wall of the trim section, and an exterior decorative member is attached to an exterior side surface of the glass run continuously from an upper end of the bottom wall of the trim section to a lower end of the outer side wall so as to cover the exterior side surface. An exterior lower reinforcing member formed of an olefin thermoplastic elastomer and exhibiting rigidity larger than that of the outer side wall is integrally formed in the lower end of the outer side wall so as to be bonded to an interior side surface of a lower end part of the exterior decorative member.

5 Claims, 5 Drawing Sheets

(56) References Cited

U.S. PATENT DOCUMENTS

| | | | | |
|---|---|---|---|---|
| 9,027,284 B2* | 5/2015 | Murree | ................ | E06B 7/2314 |
| | | | | 49/441 |
| 9,096,114 B2* | 8/2015 | Baratin | ................ | B60J 10/0051 |
| 2005/0120634 A1* | 6/2005 | Drivon | ................ | B60J 10/79 |
| | | | | 49/475.1 |
| 2006/0021281 A1* | 2/2006 | Tamaoki | ................ | B60J 10/265 |
| | | | | 49/441 |
| 2009/0064592 A1* | 3/2009 | Takase | ................ | B60J 10/277 |
| | | | | 49/374 |
| 2013/0219799 A1* | 8/2013 | Takeuchi | ................ | B60J 10/04 |
| | | | | 49/472 |
| 2015/0273990 A1* | 10/2015 | Adachi | ................ | B60J 1/17 |
| | | | | 49/459 |
| 2016/0059684 A1* | 3/2016 | Nam | ................ | B60J 10/088 |
| | | | | 49/483.1 |
| 2017/0028938 A1* | 2/2017 | Yoshida | ................ | B60J 10/30 |

\* cited by examiner

GLASS RUN

CROSS-REFERENCE TO RELATED APPLICATION

This application is related to and claims priority from Japanese patent Application No. 2016-047775 incorporated herein by reference.

BACKGROUND OF THE INVENTION

1. Field of the Invention

The present invention relates to a glass run adapted to be attached to a door frame of an automobile for providing a seal between a door opening portion and an automobile door.

2. Description of Related Art

In one example of conventional sealing structures for providing a seal between a door opening portion and an automobile door having a door sash, an opening trim weather strip is attached to a flange provided in the door opening portion, and a door weather strip is attached to an outer periphery of the door sash. When the automobile door is closed, a tubular seal portion of the opening trim weather strip contacts a protrusion of the door sash, and a tubular seal portion and a seal lip of the door weather strip contact an outer panel of the door opening portion to seal a gap between the door opening portion and the automobile door.

In this case, a door glass raised and lowered inside the automobile door is held with a glass run of which an outer periphery is attached along an inner periphery of the door sash, and is raised and lowered in a groove of the glass run, which has a generally U-shaped cross-section. This glass run provides a seal between the door glass and the door sash.

In side surfaces of the automobile, the glass runs, the door sashes and center pillars are exposed and outstanding around the door glasses so that it has been required to improve the design thereof. In addition, the glass runs exist between the door sashes and the door glasses, and between the center pillars and the door glasses so as to define gaps between surfaces of the door sashes and those of the door glasses, which are less preferable in design.

Figure 1:
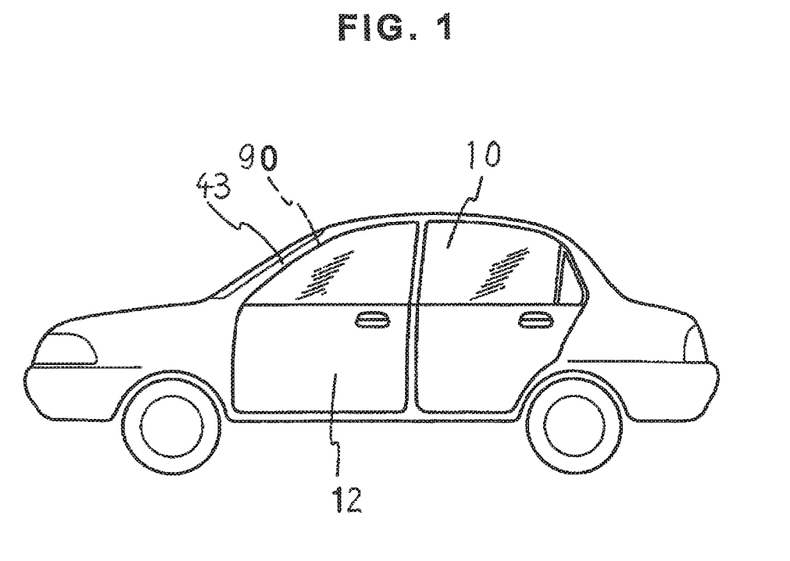
FIG. 1 is a side view of an automobile.

In order to overcome the above-described problem, as shown in FIG. 1, in a sashless door-type automobile body, an exterior surface of a door sash is removed except for a flange so as to freely raise and lower a door glass 10 above the door belt line of an automobile door 12. With this arrangement, in the side surface of the automobile, only the door glass 10 is visible above the door belt line of the automobile door 12.

Figure 2:
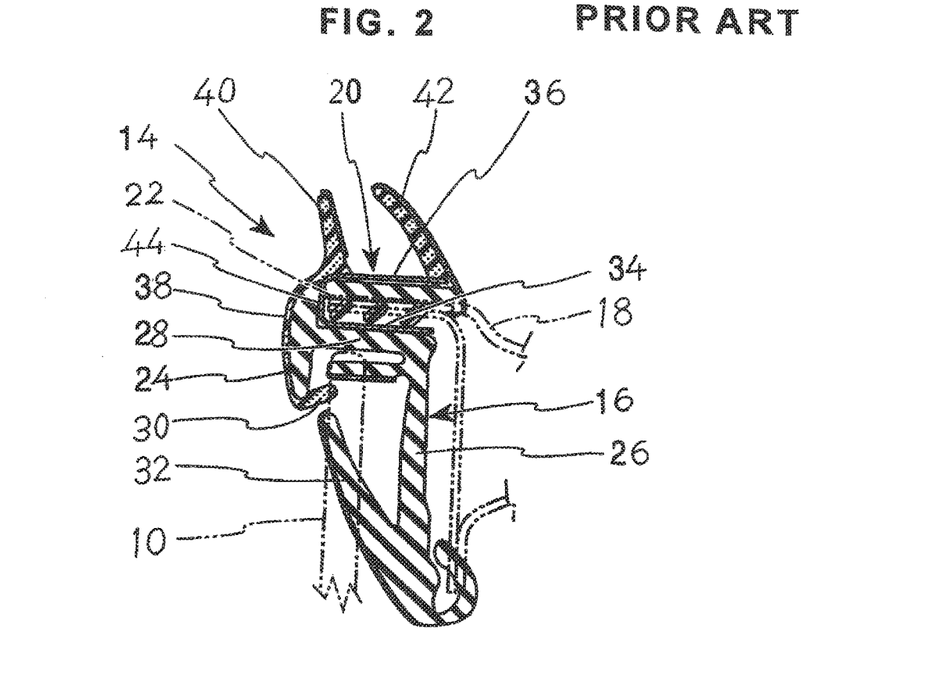
FIG. 2 is a cross-sectional view of a conventional glass run.

In this case, as shown in FIG. 2, a glass run 14 includes a glass run section 16 adapted to provide a seal between the door glass 10 and a door frame 18, and a trim section 20 adapted to attach the glass run 14 to a flange 22 located in an end edge of the door frame 18 (see Japanese patent application laid-open No. 2005-247294, for example.). The glass run section 16 has a main body of a generally U-shaped cross-section, which includes an outer side wall 24, an inner side wall 26 and a bottom wall 28, along with an outer seal lip 30 and an inner seal lip 32 respectively extending from tip ends of the outer side wall 24 and the inner side wall 26 obliquely in an interior space of the main body. The outer seal lip 30 and the inner seal lip 32 provide seals against the door glass 10.

The trim section 20 has a generally U-shaped cross-section, and includes a side wall 34 formed integrally with the bottom wall 28 of the glass run section 16, a side wall 36 formed on the side of an automobile body, and a bottom wall 38. Seal lips 40 and 42 are formed in an exterior surface of the side wall 36 for contacting and sealing a door opening portion 43 when the automobile door 12 is closed. And an insert 44 formed of metal into a generally U-shaped cross-section is embedded in the side walls 34 and 36, and the bottom wall 38.

And in order to produce the thus arranged glass run 14, the glass run section 16 and the trim section 20 are simultaneously formed along with the insert 44 linearly by extrusion.

Since the glass run 14 has the metal insert 44, the weight of the glass run 14 is great so that the entire rigidity thereof is increased. As a result, where the glass run 14 is attached to an upper side of the door frame 18 along an outer curved surface thereof, a bending work of the extruded glass run 14 has been previously needed along the curved surface. Therefore, this arrangement is contradictory to weight reduction of automobiles, requires much labor and increases production costs.

Figure 3:
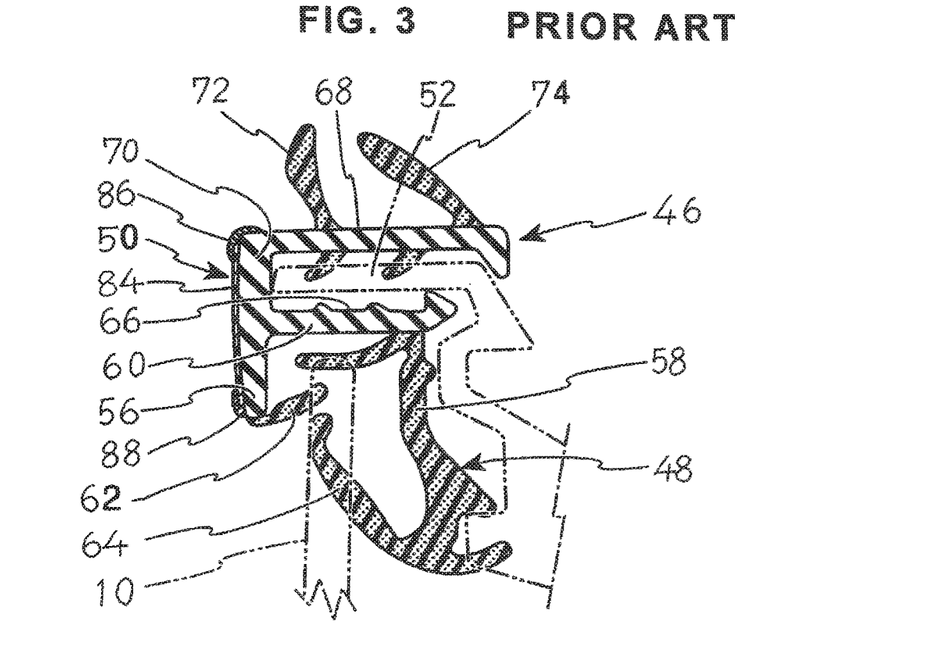
FIG. 3 is a cross-sectional view of another conventional glass run.

And, as shown in FIG. 3, in a glass run 46 including a glass run section 48 adapted to provide a seal between the door glass 10 and a door frame, and a trim section 50 adapted to attach the glass run 46 to a flange 52 located in an end edge of the door frame, the trim section 50 is formed of a thermoplastic resin as a hard material, whereas the glass run section 48 is formed of a thermoplastic elastomer as a soft material (see Japanese patent application laid-open No. 2014-196051, for example.).

The glass run section 48 has a main body of a generally U-shaped cross-section, which includes an outer side wall 56, an inner side wall 58 and a bottom wall 60, along with an outer seal lip 62 and an inner seal lip 64 respectively extending from tip ends of the outer side wall 56 and the inner side wall 58 obliquely in an interior space of the main body. The outer seal lip 62 and the inner seal lip 64 provide seals against the door glass 10.

The trim section 50 has a generally U-shaped cross-section, and includes a side wall 66 formed integrally with the bottom wall 60 of the glass run section 48, a side wall 68 formed on the side of an automobile body, and a bottom wall 70. Seal lips 72 and 74 are formed in an exterior surface of the side wall 68 for contacting and sealing the door opening portion 43 when the automobile door 12 is closed. Since no insert is provided, the outer side wall 56, the bottom wall 60, the side wall 66, the side wall 68 and the bottom wall 70 of the trim section 50 are formed of a synthetic resin as a hard material.

Figure 4:
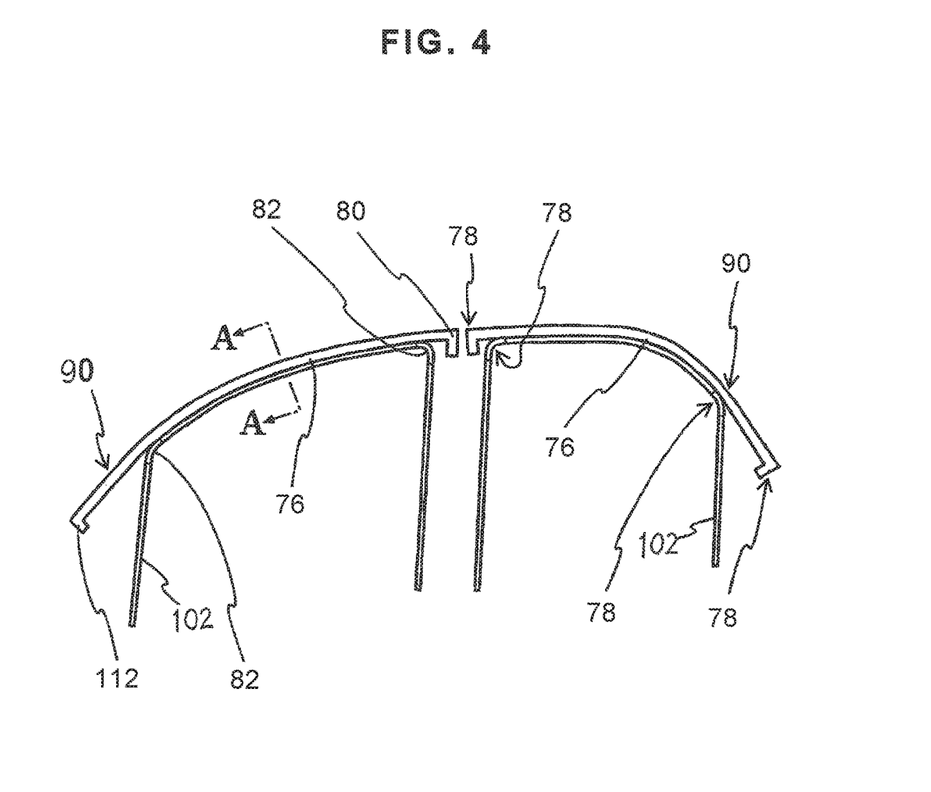
FIG. 4 is a front view of a glass run in one embodiment of the present invention.

And, as shown in FIG. 4 in association with one embodiment of the present invention, the glass run 90 includes extruded parts 76 formed by extrusion, and molded parts 78 provided and formed at each end of an extruded part 76 by molding. Each molded part 78 is welded to the end of each extruded part 76 due to heat during a molding step. In order to ensure sealing properties, formability and assembling properties, end parts 80 and corner parts 82 as the molded parts 78 of the glass run 90 are entirely formed of a soft material.

And the bottom wall 70 of the trim section 50 is formed integrally and continuously with the outer side wall 56, and an exterior decorative member 84 is bonded to an exterior side surfaces thereof. The exterior decorative member 84 is formed of a synthetic resin laminated film.

When the glass run 90 is attached to a roof side along an upper side of the door opening portion 43 of an automobile, the glass run 90 is curved to conform to a configuration of an automobile body.

At this time, an upper end side where the bottom wall 70 is formed integrally with the outer side wall 56 is extended, whereas a lower end side is compressed. As a result, wrinkles are generated in a lower end of the exterior decorative member 84 due to compression and peeling off the outer side wall 56. In order to prevent the generation of wrinkles, an upper covering member 86 and a lower covering member 88 are respectively provided along an upper end and the lower end of the exterior decorative member 84.

The upper covering member 86 covers the upper end of the exterior decorative member 84 along with the bottom wall 70 of the trim section 50, whereas the lower covering member 88 covers the lower end of the exterior decorative member 84 along with the outer side wall 56. Each of the upper covering member 86 and the lower covering member 88 has a merely slight thickness. But, it has been strongly requested to remove protrusions from surfaces of the glass run 90 and the automobile body.

SUMMARY OF THE INVENTION

It is an object of the present invention to provide a glass run capable of reducing protrusions in surfaces thereof to the minimum, and preventing peeling of an exterior decorative member.

In order to achieve the above-described object, according to a first aspect of the present invention, in a glass run adapted to be attached to a door frame of an automobile for providing a seal between the door frame and a door glass, the glass run includes a trim section adapted to be attached to a flange part formed in a tip end of the door frame, and a glass run section formed integrally with the trim section and adapted to be attached to an inner periphery of the door frame and for providing a seal between the door frame and the door glass, the glass run section includes an outer side wall, an inner side wall and a bottom wall, and has a generally U-shaped cross-section, an outer seal lip and an inner seal lip respectively extend from tip ends of the outer side wall and the inner side wall obliquely in an interior space of the glass run section, the trim section is formed of a hard material, includes one side wall located on the side of the glass run section, the other side wall located on the side of an automobile body and a bottom wall, and has a generally U-shaped cross-section, the side wall located on the side of the glass run section and the bottom wall of the glass run section are formed of either one of an integral member and an identical member, the outer side wall of the glass run section and the bottom wall of the trim section are integrally formed with each other, and an exterior decorative member is attached to an exterior side surface of the glass run continuously from an upper end of the bottom wall of the trim section to a lower end of the outer side wall so as to cover the exterior side surface, and an exterior lower reinforcing member formed of an olefin thermoplastic elastomer and exhibiting rigidity larger than that of the outer side wall is integrally formed in the lower end of the outer side wall so as to be bonded to an interior side surface of a lower end part of the exterior decorative member.

With the arrangement of the first aspect of the present invention, in a glass run adapted to be attached to a door frame of an automobile for providing a seal between the door frame and a door glass, the glass run includes a trim section adapted to be attached to a flange part formed in a tip end of the door frame, and a glass run section formed integrally with the trim section and adapted to be attached to an inner periphery of the door frame for providing a seal between the door frame and the door glass. Therefore, in order to hold the glass run section with the door frame, no channel is needed so that when the trim section is attached to the flange part of the door frame, the trim section is strongly held with the flange part of the door frame to enable the attachment of the glass run section to the door frame, thereby facilitating the attachment of the glass run.

The glass run section includes an outer side wall, an inner side wall and a bottom wall, and has a generally U-shaped cross-section, and an outer seal lip and an inner seal lip respectively extend from ends of the outer side wall and the inner side wall obliquely in an interior space of the glass run section. Therefore, an end edge of the door glass slides the interior space of the glass run section, which has a generally U-shaped cross-section, so that the door glass can be held. In addition, the outer seal lip and the inner seal lip contact the end edge of the door glass to provide a seal between the door glass and the door frame.

The trim section is formed of a hard material, includes one side wall located on the side of the glass run section, the other side wall located on the side of an automobile body and a bottom wall, and has a generally U-shaped cross-section, and the side wall located on the side of the glass run section and the bottom wall of the glass run section are formed of an integral member or an identical member. Therefore, in order to hold the glass run section with the door frame, no channel is needed so that when the trim section formed of the hard material is attached to the flange part of the door frame, the trim section can be strongly held with the flange part, and the glass run section can be attached to the door frame, thereby facilitating the attachment of the glass run. In addition, the flange part in the tip end of the door frame can be held with the trim section, thereby holding the glass run with the door frame. Furthermore, the glass run section and the trim section are formed firmly and integrally with each other to hold the glass run section with the trim section.

The outer side wall of the glass run section and the bottom wall of the trim section are integrally formed with each other, and an exterior decorative member is attached to an exterior side surface of the glass run continuously from an upper end of the bottom wall of the trim section to a lower end of the outer side wall so as to cover the exterior side surface. Therefore, the outer side wall of the glass run section and the bottom wall of the trim section define an exterior side surface of the glass run to hold the door glass without being drawn outwardly, and the appearance of the exterior side surface of the glass run can be improved by virtue of the exterior decorative member.

An exterior lower reinforcing member formed of an olefin thermoplastic elastomer and exhibiting rigidity larger than that of the outer side wall is integrally formed in the lower end of the outer side wall so as to be bonded to an interior side surface of a lower end part of the exterior decorative member. Therefore, when the glass run is attached to a curved surface of a roof side of an automobile body, a neutral point of deformation during the curving deformation of the glass run shifts toward a lower end side thereof to decrease the compression amount of the lower end side of the glass run. In addition, the exterior lower reinforcing member exhibiting large rigidity is strongly bonded to the exterior decorative member, whereby the compression amount of the lower end side of the glass run can be decreased.

And the exterior side surface of the lower end part of the exterior decorative member is restrained from peeling off the outer side wall, and the exterior lower reinforcing member can be bonded to the lower end part of the exterior decorative member so as to cover a cut section of the lower end part of the exterior decorative member without protruding from the exterior side surface of the lower end part of the exterior decorative member, whereby the appearance of the glass run from the exterior side of the automobile is improved, and the peeling of the lower end part of the exterior decorative member can be securely prevented. In addition, the cut section of the lower end part of the exterior decorative member is covered to improve the durability of the exterior decorative member.

According to a second aspect of the present invention, the cross-sectional area of the exterior lower reinforcing member ranges from 1 to 2.5 mm$^2$.

With the arrangement of the second aspect of the present invention, the cross-sectional area of the exterior lower reinforcing member ranges from 1 to 2.5 mm$^2$ so that the glass run can be curved, the rigidity of the lower end side of the glass run is improved, the compression amount is decreased, and the lower end part of the exterior decorative member is restrained from peeling off the outer side wall. Where the cross-sectional area of the exterior lower reinforcing member is less than 1 mm$^2$, the rigidity of the lower end side of the glass run cannot be sufficiently improved, whereas where the cross-sectional area exceeds 2.5 mm$^2$, the rigidity of the lower end side of the glass run becomes too large so that when the glass run is attached along a curved surface of a roof side of the automobile body, the glass run is difficult to be bent along the curved surface of the roof side of the automobile body.

According to a third aspect of the present invention, the exterior decorative member is a decorative tape exhibiting metallic luster.

With the arrangement of the third aspect of the present invention, the exterior decorative member is a decorative tape exhibiting metallic luster so that the exterior side surface of the glass run can be formed to exhibit a metallic luster color by virtue of the exterior decorative member, whereby the appearance therearound can be improved, and the glass run can be attached to the door frame while curving along the curved surface of the roof side of the automobile body.

According to a fourth aspect of the present invention, the rigidity of the exterior lower reinforcing member exhibits an international rubber hardness (IRHD) ranging from 95 to 100, and the rigidity of the material of the outer side wall exhibits an international rubber hardness (IRHD) ranging from 85 to 90.

With the arrangement of the fourth aspect of the present invention, the rigidity of the exterior lower reinforcing member exhibits an international rubber hardness (IRHD) ranging from 95 to 100 so that the rigidity of the exterior lower reinforcing member is made larger than that of the outer side wall, and the rigidity of the lower end of the outer side wall is improved, whereby when the glass run is attached along a curved surface of a roof side of the automobile body, a neutral point of deformation during the curving deformation of the glass run shifts toward the lower end side thereof to decrease the compression amount of the lower end side of the glass run.

Where the international rubber hardness (IRHD) of the exterior lower reinforcing member is less than 95, the rigidity of the lower end side of the glass run cannot be sufficiently improved, whereas where the international rubber hardness (IRHD) exceeds 100, the rigidity of the lower end side of the glass run becomes excessively large, and as a result, when the glass run is attached along the curved surface of the roof side of the automobile body, the glass run is difficult to be bent along the curved surface of the roof side of the automobile body.

According to a fifth aspect of the present invention, the outer side wall and the bottom wall of the glass run section are formed of a hard material, whereas the inner side wall, the outer seal lip and the inner seal lip are formed of a soft material, and the bottom wall of the glass run section has a bottom seal lip formed of a soft material.

With the arrangement of the fifth aspect of the present invention, the outer side wall and the bottom wall of the glass run section are formed of a hard material. As a result, the outer side wall and the bottom wall of the glass run section can prevent the end edge of the door glass from being drawn outwardly. In addition, the outer seal lip and the inner seal lip, each being formed of a soft material, flexibly contact a side surface of the door glass to provide a seal against the side surface of the door glass.

Since the bottom wall of the glass run section has a bottom seal lip formed of a soft material, the end edge of the door glass is sealed with the bottom seal lip so that when the door glass is raised, shocks applied with the door glass against the bottom wall of the glass run section can be absorbed to prevent slippages of the trim section, and improve the sealing properties between the end edge of the door glass and the bottom wall of the glass run.

An exterior lower reinforcing member formed of an olefin thermoplastic elastomer and exhibiting rigidity larger than that of the outer side wall is integrally formed in a lower end of the outer side wall so as to be bonded thereto so that when the glass run is attached to a curved surface of a roof side of an automobile body, a neutral point of deformation during the curving deformation of the glass run shifts toward the lower end side thereof to decrease the compression amount of the lower end side of the glass run. In addition, the exterior lower reinforcing member exhibiting large rigidity is strongly bonded to the exterior decorative member, whereby the compression amount of the lower end side of the glass run can be decreased, and the lower end part of the exterior decorative member can be restrained from peeling off the outer side wall.

Other objects, features, and characteristics of the present invention will become apparent upon the consideration of the following description and the appended claims with reference to the accompanying drawings, all of which form a part of this specification.

DETAILED DESCRIPTION OF THE PREFERRED EMBODIMENTS

One embodiment of the present invention will be explained with reference to FIG. 1 and FIGS. 4 through 6.

Figure 5:
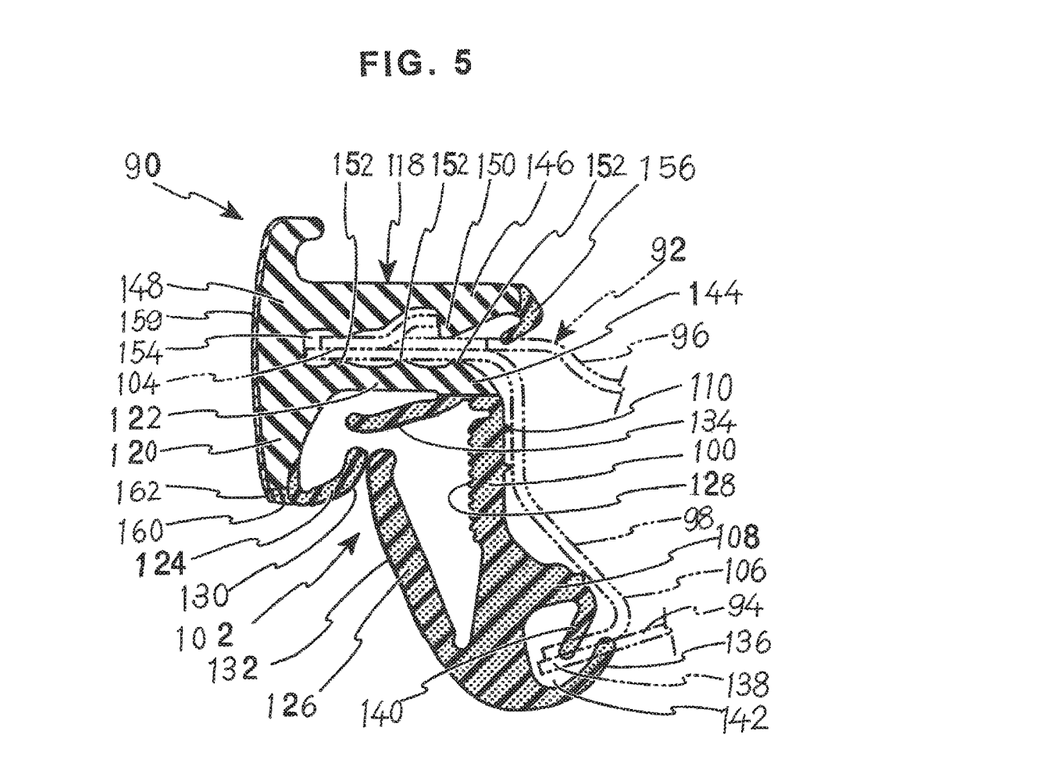
FIG. 5 is a cross-sectional view of a glass run in one embodiment of the present invention, taken along line A-A in FIG. 4.
Figure 6:
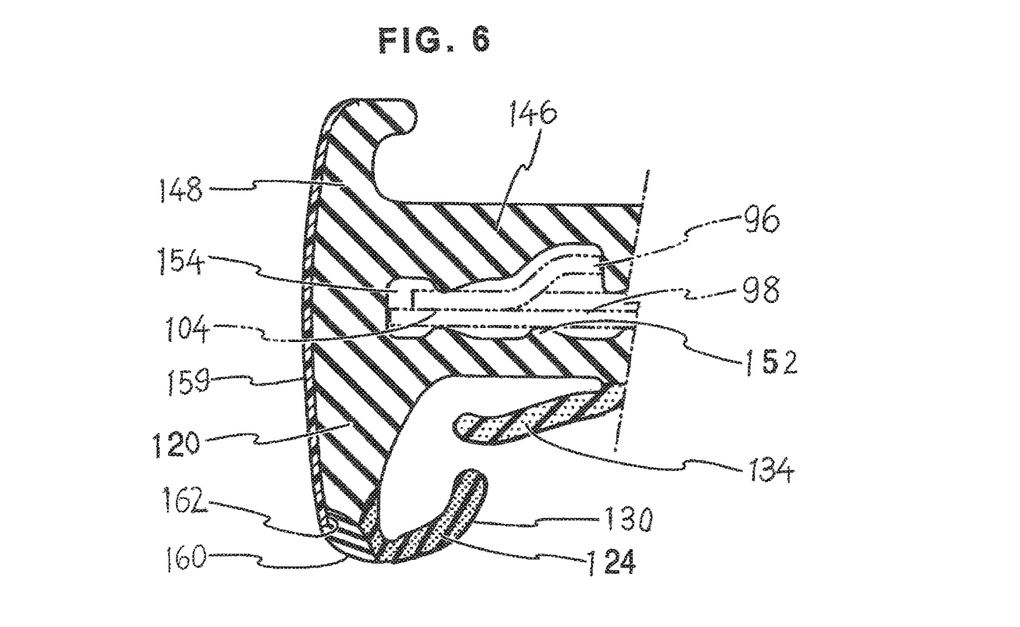
FIG. 6 is an enlarged cross-sectional view of a bottom wall of a trim section and an outer side wall of a glass run in one embodiment of the present invention.

FIG. 5 and FIG. 6 show one embodiment of the present invention. FIG. 4 is a front view of a glass run 90 in the present embodiment of the present invention, which shows the configuration of the glass run 90 when attached to a door frame 92 of an automobile door 12.

FIG. 1 is a side view of an automobile. The door frame 92 is provided in a part of an upper portion of the door 12, which faces a door opening portion 43 of an automobile body, and a door glass 10 is attached to the door frame 92 so as to be raised and lowered therealong. The glass run 90 is attached to an inner periphery of the door frame 92 to guide the raising and lowering of the door glass 10 and provide a seal between the door glass 10 and the door frame 92.

The present embodiment of the present invention will be explained with reference to FIG. 5 and FIG. 6.

As shown in FIG. 5, the door frame 92 includes an outer panel 94 and an inner panel 96, and the glass run 90 is adapted to attach to a tip end part of the door frame 92 through a door frame attaching surface 98 defined by tip end parts of the outer panel 94 and the inner panel 96 being joined to each other and attaching an inner side wall 100 of a later-described glass run section 102 to the door frame attaching surface 98. A tip end part of the door frame attaching surface 98 and the tip end part of the inner panel 96 define a part 104.

The door frame attaching surface 98 has a door frame attaching recess 106 having a generally U-shaped cross-section, for contacting a later-described inner holding ridge 108 of the inner side wall 100. The inner holding ridge 108 is engaged with the door frame attaching recess 106. As a result, the inner side wall 100 is securely held with the door frame 92. In addition, inner ridges 110 formed in an exterior surface of the inner side wall 100 contact the door frame attaching surface 98.

As shown in FIG. 4, end or tip end parts 80 are formed in tip ends of the glass run 90.

The glass run sections 102 for attachment to vertical sides of the door frame 92 are connected to front and rear corner parts 82 of the glass run 90 so as to extend downwardly. As a result, not only an upper side of the door frame 92 but also parts along vertical sides of the door glass 10 can be held and sealed with the glass run sections 102. The glass run sections 102 for attachment to connection parts between the upper side and vertical sides of the door frame 92 define corner parts 82, and upper side parts and vertical side parts of the glass run sections 102 are connected to each other with the corner parts 82 by molding.

As shown in FIG. 5, the glass run 90 for attachment to the upper side of the door frame 92 includes the glass run section 102 for attachment along the inner periphery of the door frame 92 and a trim section 118 for attachment to the flange part 104 provided in a tip end of the door frame 92. First, configurations of the glass run section 102 and the trim section 118 will be respectively explained.

The glass run section 102 has a main body of a generally U-shaped cross-section, which includes an outer side wall 120, the inner side wall 100 and a bottom wall 122. An outer seal lip 124 and an inner seal lip 126 respectively extend from tip ends of the outer side wall 120 and the inner side wall 100 obliquely in an interior space of the main body. Therefore, an end edge of the door glass 10 slides in the interior space of the main body of the glass run section 102, which includes the outer side wall 120, the inner side wall 100 and the bottom wall 122, thereby holding the door glass 10.

The inner side wall 100, the outer seal lip 124 and the inner seal lip 126 of the glass run section 102 are formed of a soft material. It is preferable to use an olefin thermoplastic elastomer as the soft material. Since the soft material is used, the outer seal lip 124 and the inner seal lip 126 can flexibly bend. When the door glass 10 is raised, they can securely contact the end edge of the door glass 10 to provide a seal between the door glass 10 and the door frame 92.

Ridges 128 are formed in an interior side surface of the inner side wall 100 for contacting the inner seal lip 126 so that when the inner seal lip 126 contacts the inner side wall 100, the inner seal lip 126 can be prevented from sticking to the inner side wall 100.

Where the olefin thermoplastic elastomer is used as the soft material, and the trim section 118 is formed of an olefin synthetic resin as a hard material, they are readily welded to each other, and recycling is facilitated. Alternatively, foamed bodies can be used.

The outer side wall 120 and the bottom wall 122 are formed of a later-described hard material.

A root of the outer side wall 120 is formed thick, and the thickness thereof decreases toward its tip end. And the outer side wall 120 is formed such that an interior surface thereof is curved. Therefore, the outer side wall 120 exhibits a large rigidity so that when the door frame 92 is curved greatly, the deformations such as wrinkling or waving of the outer side wall 120 can be reduced. And if the door glass 10 shifts to the exterior side of the automobile, the end edge of the door glass 10 can be held with the outer side wall 120 so that the door glass 10 does not come off the glass run section 102.

It is preferable to increase the dimensions and the wall thickness of the inner side wall 100 and the inner seal lip 126, as compared with those of the outer side wall 120 and the outer seal lip 124. In this case, when the door glass 10 is raised and inserted in the interior space of the glass run 90, the door glass 10 can be shifted outwardly to reduce level differences in an exterior side surface of the door 12, thereby improving the appearance therearound, and reducing the generation of wind noises. In addition, the inner side wall 100 can be securely attached to the door frame attaching surface 98 of the door frame 92.

Figure 6A:
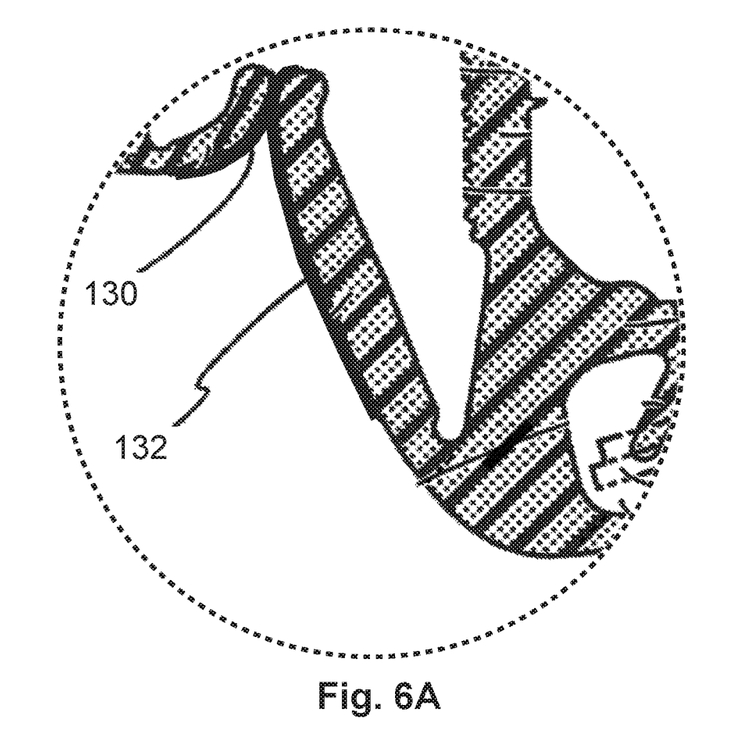
FIG. 6A is an portion of a view of FIG. 6 corresponding to the area encircled by the dashed line that has been enlarged for magnification purposes.

Layers, each being formed of a hard material, are formed on an outer sliding surface 130 of the outer seal lip 124 and an inner sliding surface 132 of the inner seal lip 126, which respectively contact the door glass 10. Since the outer sliding surface 130 and the inner sliding surface 132 are formed of the hard material as better shown in FIG. 6A, they exhibit low sliding frictions against the door glass 10 to define low sliding layers. With this arrangement, the door glass 10 can be raised and lowered smoothly, and generation of abnormal noises can be prevented.

A bottom seal lip 134 can be formed on an interior side of the bottom wall 122 so as to project from a joint between the inner side wall 100 and the bottom wall 122. The bottom seal lip 134 is formed of a soft material, similarly to the outer seal lip 124 and the inner seal lip 126.

When the door glass 10 is raised, the bottom seal lip 134 contacts an upper end edge of the door glass 10 to absorb shocks against the bottom wall 122. It is preferable to apply a low friction sliding material to a surface of the bottom seal lip 134, too.

An inner cover lip 136 is provided in a tip end of an exterior surface of the inner side wall 100. A lower end of the door frame attaching surface 98 bends and is joined to the tip end part of the outer panel 94 to define a flange part 138. The inner cover lip 136 covers and contacts a tip end of the flange part 138.

The inner holding ridge 108 for engagement with the door frame attaching recess 106 is provided on the exterior surface of the inner side wall 100. An inner holding lip 140 is formed to project from a tip end of the inner holding ridge 108 in a direction of the inner cover lip 136 to define an inner engaging recess 142 with the inner cover lip 136 and the inner holding lip 140. The flange part 138 formed by joining the end parts of the door frame attaching surface 98 and the outer panel 94 is engaged with the inner engaging recess 142, whereby the inner side wall 100 is held with the door frame 92.

The outer seal lip 124, the inner seal lip 126, the inner cover lip 136 and the inner holding ridge 108 are formed of a later-described soft material. As a result, the outer seal lip 124 and the inner seal lip 126 can provide a seal against the end edge of the door glass 10. In addition, the inner side wall 100 flexibly bends so that if the door frame 92 is curved, the inner side wall 100 can be readily attached to the door frame 92.

Next, the trim section 118 will be explained. The trim section 118 has a generally U-shaped cross-section, and includes a side wall 144 formed integrally with the bottom wall 122, a side wall 146 facing the door opening portion 43, and a bottom wall 148.

The flange part 104 provided in the tip end of the door frame 92 is inserted into an interior space of the trim section 118, and held therewith, whereby the glass run 90 is attached to the door frame 92.

In the present embodiment, the bottom wall 122 of the glass run section 102 and the side wall 144 of the trim section 118 are integrally formed as an identical member composed of an identical hard material. Alternatively, the bottom wall 122 of the glass run section 102 and the side wall 144 of the trim section 118 may be integrally formed of different materials by fusing them to each other.

An outer holding protrusion 150 is formed in an interior surface of the side wall 146, whereas three inner holding ridges 152 are formed in an interior surface of the side wall 144. As shown in FIG. 5, when the flange part 104 is inserted in a flange groove 154 as an interior space of the trim section 118, one surface of the flange part 104 can be held with the outer holding protrusion 150, whereas the other surface of the flange part 104 can be held with the inner holding ridges 152.

A cover lip 156 is formed in an interior surface of the tip end of the side wall 146. As shown in FIG. 5, when the flange part 104 is inserted in the interior space of the flange groove 154, the cover lip 156 contacts a root of the flange part 104 to provide a seal between the trim section 118 and the flange part 104.

The cover lip 156 is formed of a soft material, and is formed continuously in a longitudinal direction thereof. As a result, the cover lip 156 securely contacts the flange part 104. And when molded parts 78 are formed, the cover lip 156 is strongly welded to a tip end of each of the molded parts 78 composed of a soft material to prevent the peeling of the trim section 118 of each molded part 78 and each extruded part 76.

The trim section 118 is arranged such that the side wall 144, the side wall 146, the bottom wall 148, the outer holding protrusion 150 and the inner holding ridges 152 are formed of a hard material, whereas the cover lip 156 is formed of a soft material. The glass run section 102 is formed simultaneously with the trim section 118 by extruding the hard material and the soft material. As described above, the outer side wall 120 of the glass run section 102 is formed of a hard material.

As a result, the main body of the trim section 118 exhibits high rigidity so as to hold the flange part 104. The cover lip 156 flexibly contacts the door opening portion 43 to conform to the configuration thereof, thereby providing a seal thereagainst.

As shown in FIG. 5 and FIG. 6, the outer side wall 120 of the glass run section 102 is formed integrally and continuously with the bottom wall 148 of the trim section 118, and an exterior surface thereof is formed into a smoothly circular-arc shape. An exterior decorative member 159 is continuously attached to exterior side surfaces of the bottom wall 148 and the outer side wall 120, which range from an upper end of the bottom wall 148 to a lower end of the outer side wall 120 so as to cover the exterior side surfaces.

Therefore, the outer side wall 120 of the glass run section 102 and the bottom wall 148 of the trim section 118 define an exterior surface of the glass run 90 so that the door glass 10 is held without being drawn outwardly, and the appearance of the exterior side surface of the glass run 90 can be improved by virtue of the exterior decorative member 159.

Where the exterior decorative member 159 is formed of an olefin synthetic resin, it exhibits good adhesion to an exterior lower reinforcing member 160 to ensure the improvement in reinforcing effects.

The exterior decorative member 159 is continuously bonded to the exterior side surfaces of the outer side wall 120 and the bottom wall 148 of the trim section 118. It is preferable to use a decorative tape exhibiting metallic luster as the exterior decorative member 159. Where the decorative tape exhibiting metallic luster is used as the exterior decorative member 159, the exterior side surface of the glass run 90 can be made into a metallic luster color by virtue of the exterior decorative member 159 to improve the appearance therearound.

The exterior lower reinforcing member 160 formed of an olefin thermoplastic elastomer and exhibiting rigidity larger than that of the outer side wall 120 is integrally bonded to the lower end of the outer side wall 120. As shown in FIG. 6, the exterior lower reinforcing member 160 is formed continuously with the outer sliding surface 130 of the outer seal lip 124 so as to be bonded to an interior side surface of a lower end part 162 of the exterior decorative member 159.

Since the exterior lower reinforcing member 160 is bonded to a reverse surface of the lower end part 162 of the exterior decorative member 159, the compression amount of the glass run 90 on the lower end side thereof can be decreased, and a lower end of the exterior decorative member 159 can be restrained from peeling off the outer side wall 120.

It is preferable that the rigidity of the material of the outer side wall 120 exhibits an international rubber hardness (IRHD) ranging from 85 to 90, and it is preferable that the rigidity of the exterior lower reinforcing member 160 is larger than that of the outer side wall 120, which exhibits an international rubber hardness (IRHD) ranging from 95 to 100. Since the rigidity of the exterior lower reinforcing member 160 is larger than that of the outer side wall 120, the rigidity of the lower end of the outer side wall 120 is improved, whereby when the glass run 90 is attached along a curved surface of a roof side of the automobile body, a neutral point of deformation during the curving deformation of the glass run 90 shifts toward the lower end side thereof to decrease the compression amount of the lower end side of the glass run 90.

Furthermore, since the exterior lower reinforcing member 160 exhibiting large rigidity is strongly bonded to the lower end part 162 of the exterior decorative member 159, the compression amount of the lower end side of the glass run 90 is decreased, and the lower end of the exterior decorative member 159 is restrained from peeling off the outer side wall 120. In addition, the exterior lower reinforcing member 160 covers a cut section of the lower end part 162 of the exterior decorative member 159 to improve the durability of the exterior decorative member 159.

Where the international rubber hardness (IRHD) of the exterior lower reinforcing member 160 is less than 95, the rigidity of the lower end side of the glass run 90 cannot be sufficiently improved, whereas where the international rubber hardness (IRHD) exceeds 100, the rigidity of the lower end side of the glass run 90 becomes excessively large, and as a result, when the glass run 90 is attached along the curved surface of the roof side of the automobile body, the glass run 90 is difficult to be bent along the curved surface of the roof side of the automobile body to deteriorate the assembling property of the glass run 90 to the automobile body.

It is preferable that the cross-sectional area of the exterior lower reinforcing member 160 ranges from 1 to 2.5 mm$^2$. In this case, the rigidity of the lower end side of the glass run 90 is improved to decrease the compression amount thereof, and the lower end part 162 of the exterior decorative member 159 is restrained from peeling off the outer side wall 120.

Where the cross-sectional area of the exterior lower reinforcing member 160 is less than 1 mm$^2$, the rigidity of the lower end side of the glass run 90 cannot be sufficiently improved, whereas where the cross-sectional area exceeds 2.5 mm$^2$, the rigidity of the lower end side of the glass run 90 becomes excessively large so that when the glass run 90 is attached along the curved surface of the roof side of the automobile body, the glass run 90 is difficult to be bent along the curved surface of the roof side of the automobile body.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run adapted to be attached to a door frame of an automobile for sealing between the door frame and a door glass, comprising:
  a trim section configured to attach to a flange in a tip end of the door frame of the automobile, and
  a glass run section formed integrally with the trim section and configured to attach to an inner periphery of the door frame for sealing between the door frame and the door glass,
  the glass run section has a length extending along the inner periphery of the door frame, includes an outer side wall, an inner side wall and a bottom wall, and has a width with a generally U-shaped cross-section, the outer side wall and the inner sidewall of the glass run section each having a respective tip end, and an outer seal lip and an inner seal lip respectively extending from the tip ends of the outer side wall and the inner side wall obliquely in an interior space of the glass run section,
  the trim section is formed of a hard material, includes one side wall located on and extending integrally alongside the glass run section, another side wall located on a side of an automobile body and a bottom wall, and has a width with a generally U-shaped cross-section, the one side wall of the trim section and the bottom wall of the glass run section are integrally formed,
  the outer side wall of the glass run section and the bottom wall of the trim section are integrally formed with each other, an exterior decorative member is attached to an exterior side surface of the glass run continuously from an upper end of the bottom wall of the trim section to a lower end of the outer side wall and covers the exterior side surface, and
  an exterior lower reinforcing member formed of an olefin thermoplastic elastomer is integrally formed on the lower end of the outer side wall and bonded to an interior side surface of a lower end part of the exterior decorative member such that the exterior decorative member covers an exterior facing surface of the exterior lower reinforcing member and bonded to the outer seal lip such that the exterior lower reinforcing member covers an exterior facing surface of the outer seal lip, a rigidity of the exterior lower reinforcing member is larger than a rigidity of the outer side wall.

2. The glass run as claimed in claim 1, wherein the cross-sectional area of the exterior lower reinforcing member ranges from 1 to 2.5 mm$^2$.

3. The glass run as claimed in claim 1, wherein the exterior decorative member is a decorative tape exhibiting metallic luster.

4. The glass run as claimed ire claim 1, wherein the rigidity of the exterior reinforcing member exhibits an international rubber hardness (IRHD) ranging from 95 to 100, and the rigidity of the material of the outer side wall exhibits an international rubber hardness (IRHD) ranging from 85 to 90.

5. The glass run as claimed in claim 1, wherein the outer side wall and the bottom wall of the glass run section are formed of the hard material, whereas the inner side wall, the outer seal lip and the inner seal lip are formed of a soft material, and the bottom wall of the glass run section has a bottom seal lip formed of a soft material, the soft material being a member selected from the group consisting of a thermoplastic elastomer and a sponge rubber.

* * * * *